United States Patent
Deshpande et al.

(10) Patent No.: US 10,719,803 B2
(45) Date of Patent: Jul. 21, 2020

(54) AUTOMATIC LEARNING OF WEIGHT SETTINGS FOR MULTI-OBJECTIVE MODELS

(71) Applicant: International Business Machines Corporation, Armonk, NY (US)

(72) Inventors: Ajay A. Deshpande, White Plains, NY (US); Saurabh Gupta, Irving, TX (US); Arun Hampapur, Norwalk, CT (US); Ali Koc, White Plains, NY (US); Dingding Lin, Beijing (CN); Xuan Liu, Yorktown Heights, NY (US); Brian L. Quanz, Yorktown Heights, NY (US); Yue Tong, Beijing (CN); Dahai Xing, White Plains, NY (US); Xiaobo Zheng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 15/086,875

(22) Filed: Mar. 31, 2016

(65) Prior Publication Data
US 2017/0206485 A1 Jul. 20, 2017

Related U.S. Application Data

(60) Provisional application No. 62/279,738, filed on Jan. 16, 2016.

(51) Int. Cl.
*G06Q 10/08* (2012.01)
*G06Q 30/02* (2012.01)
(Continued)

(52) U.S. Cl.
CPC ..... *G06Q 10/08345* (2013.01); *G06F 3/0482* (2013.01); *G06F 3/04847* (2013.01);
(Continued)

(58) Field of Classification Search
CPC . G06Q 10/08345; G06Q 10/08; G06Q 10/087
(Continued)

(56) References Cited

U.S. PATENT DOCUMENTS

| | | | | |
|---|---|---|---|---|
| 5,630,070 A | * | 5/1997 | Dietrich | G06Q 10/06 705/7.23 |
| 5,953,707 A | * | 9/1999 | Huang | G06Q 10/06 705/7.25 |

(Continued)

FOREIGN PATENT DOCUMENTS

WO 2005067434 A2 7/2005

OTHER PUBLICATIONS

Ge Wang, Samuel H. Huang, John P. Dismukes, "Product-driven supply chain selection using integrated multi-criteria decision-making methodology", International Journal of Production Economics, vol. 91, Issue 1, 2004, pp. 1-15, ISSN 0925-5273, https://doi.org/10.1016/S0925-5273(03)00221-4. (Year: 2004).*

(Continued)

*Primary Examiner* — Eric W Stamber
*Assistant Examiner* — George H Walker, III
(74) *Attorney, Agent, or Firm* — Scully, Scott, Murphy & Presser, P.C.; Joseph Petrokaitis

(57) ABSTRACT

A historical scenario and historical decisions made in the historical scenario are received. The historical decisions represent a set of decision variables of an objective function. A random set of decision variables having different values than the set of decision variables are generated. To determine a weight setting associated with multiple objectives of the objective function, a number of inequalities are built and solved with an assumption that, for an optimization that minimizes the objective function, the objective function having the set of random decision variables has a larger value than the objective function having the set of decision
(Continued)

variables. The receiving, the generating and the building steps may be repeated to determine multiple sets of weight settings. The multiple sets of weight settings are searched to select a target weight setting for each of the multiple objectives. The target weight setting may be automatically and continuously learned.

20 Claims, 3 Drawing Sheets

(51) Int. Cl.
| | |
|---|---|
| G06N 20/00 | (2019.01) |
| G06F 16/14 | (2019.01) |
| G06F 16/182 | (2019.01) |
| G06F 16/17 | (2019.01) |
| G06F 16/23 | (2019.01) |
| G06N 5/00 | (2006.01) |
| G06F 3/0482 | (2013.01) |
| G06F 3/0484 | (2013.01) |
| G06Q 30/06 | (2012.01) |
| H04L 12/26 | (2006.01) |
| G06N 5/04 | (2006.01) |
| G06Q 10/06 | (2012.01) |

(52) U.S. Cl.
CPC ........ *G06F 16/148* (2019.01); *G06F 16/1734* (2019.01); *G06F 16/183* (2019.01); *G06F 16/1844* (2019.01); *G06F 16/2365* (2019.01); *G06N 5/003* (2013.01); *G06N 5/04* (2013.01); *G06N 5/045* (2013.01); *G06N 20/00* (2019.01); *G06Q 10/0633* (2013.01); *G06Q 10/06315* (2013.01); *G06Q 10/06375* (2013.01); *G06Q 10/083* (2013.01); *G06Q 10/087* (2013.01); *G06Q 10/0833* (2013.01); *G06Q 10/0838* (2013.01); *G06Q 10/0875* (2013.01); *G06Q 30/0201* (2013.01); *G06Q 30/0206* (2013.01); *G06Q 30/0283* (2013.01); *G06Q 30/0284* (2013.01); *G06Q 30/0635* (2013.01); *H04L 43/0882* (2013.01); *H04L 43/16* (2013.01); *H04L 43/0876* (2013.01)

(58) Field of Classification Search
USPC ........................................................ 705/7.37
See application file for complete search history.

(56) References Cited

U.S. PATENT DOCUMENTS

| | | | |
|---|---|---|---|
| 7,016,873 B1* | 3/2006 | Peterson | G06Q 40/00 705/35 |
| 7,363,280 B2 | 4/2008 | Jin et al. | |
| 7,370,005 B1 | 5/2008 | Ham et al. | |
| 7,403,911 B2* | 7/2008 | Guler | G06Q 30/02 705/14.27 |
| 7,848,953 B2 | 12/2010 | Kahlon et al. | |
| 7,917,387 B2 | 3/2011 | Spurr et al. | |
| 7,966,207 B2 | 6/2011 | Altice et al. | |
| 8,015,081 B1 | 9/2011 | Franco | |
| 8,065,172 B2 | 11/2011 | Mauthe et al. | |
| 8,204,799 B1 | 6/2012 | Murray et al. | |
| 8,249,917 B1 | 8/2012 | Kassmann et al. | |
| 8,352,382 B1 | 1/2013 | Katta et al. | |
| 8,374,922 B1 | 2/2013 | Antony | |
| 8,407,172 B1* | 3/2013 | Nering | G06Q 10/04 706/45 |
| 8,429,035 B1* | 4/2013 | Kamath | G06Q 10/0633 705/28 |
| 8,560,827 B1 | 10/2013 | Yiftachel et al. | |
| 8,566,267 B1* | 10/2013 | Ledbetter, Jr. | G06Q 10/04 706/46 |
| 8,626,333 B2 | 1/2014 | Waddington et al. | |
| 8,700,443 B1 | 4/2014 | Murray et al. | |
| 8,818,836 B1 | 8/2014 | Braumoeller et al. | |
| 9,324,048 B2 | 4/2016 | Ptak et al. | |
| 9,940,603 B1 | 4/2018 | Caven et al. | |
| 2001/0047293 A1* | 11/2001 | Waller | G06Q 10/087 705/22 |
| 2002/0035537 A1* | 3/2002 | Waller | G06Q 10/087 705/37 |
| 2002/0103688 A1* | 8/2002 | Schneider | A01B 79/00 705/7.28 |
| 2002/0156663 A1 | 10/2002 | Weber et al. | |
| 2003/0046130 A1* | 3/2003 | Golightly | G06Q 10/04 705/7.24 |
| 2003/0078901 A1* | 4/2003 | Coppola, Jr. | G01V 9/02 706/21 |
| 2003/0093388 A1 | 5/2003 | Albright | |
| 2003/0149613 A1* | 8/2003 | Cohen | G06Q 10/04 705/7.42 |
| 2003/0172007 A1 | 9/2003 | Helmolt et al. | |
| 2003/0195780 A1* | 10/2003 | Arora | G06Q 10/06 705/35 |
| 2003/0195791 A1* | 10/2003 | Waller | G06Q 10/087 705/22 |
| 2005/0021583 A1* | 1/2005 | Andrzejak | G06Q 10/06 708/446 |
| 2005/0119983 A1* | 6/2005 | Bonabeau | G06N 3/126 706/46 |
| 2005/0246148 A1* | 11/2005 | Levitan | G06F 17/11 703/2 |
| 2006/0112049 A1 | 5/2006 | Mehrotra et al. | |
| 2006/0200333 A1* | 9/2006 | Dalal | G06F 17/5009 703/17 |
| 2007/0027745 A1* | 2/2007 | Ouimet | G06Q 10/04 705/7.31 |
| 2007/0038657 A1* | 2/2007 | Denton | G06Q 10/04 |
| 2007/0156555 A1* | 7/2007 | Orr | G06Q 10/04 705/35 |
| 2007/0201425 A1* | 8/2007 | Smith | G06N 5/003 370/351 |
| 2007/0239640 A1* | 10/2007 | Coppola, Jr. | G01V 9/02 706/21 |
| 2009/0012923 A1* | 1/2009 | Moses | G06Q 10/10 706/46 |
| 2009/0204245 A1* | 8/2009 | Sustaeta | G05B 13/024 700/99 |
| 2009/0204267 A1* | 8/2009 | Sustaeta | G05B 13/0285 700/291 |
| 2010/0250298 A1* | 9/2010 | Channabasavaiah | G06Q 10/06 705/7.36 |
| 2011/0213730 A1 | 9/2011 | Carty et al. | |
| 2012/0150583 A1 | 6/2012 | Dueck et al. | |
| 2012/0150692 A1 | 6/2012 | Dueck et al. | |
| 2013/0166353 A1* | 6/2013 | Mihic | G06Q 30/02 705/7.35 |
| 2013/0166468 A1 | 6/2013 | Vogelgesang et al. | |
| 2014/0122390 A1* | 5/2014 | Narisetty | G06N 20/00 706/12 |
| 2014/0136255 A1 | 5/2014 | Grabovski et al. | |
| 2014/0143099 A1 | 5/2014 | Wilkins | |
| 2014/0279294 A1 | 9/2014 | Field-Darragh et al. | |
| 2014/0310048 A1 | 10/2014 | Murray et al. | |
| 2014/0343923 A1* | 11/2014 | Heilman | G06F 17/2785 704/9 |
| 2015/0052019 A1 | 2/2015 | Field-Darraugh et al. | |
| 2015/0112905 A1 | 4/2015 | Miner et al. | |
| 2015/0112906 A1 | 4/2015 | Gauthier et al. | |
| 2015/0127438 A1 | 5/2015 | Wedderburn et al. | |
| 2015/0205759 A1* | 7/2015 | Israel | G06N 10/00 703/2 |
| 2015/0331833 A1* | 11/2015 | Lustig | G06F 17/11 708/207 |
| 2017/0083967 A1 | 3/2017 | Shiely et al. | |

(56) References Cited

U.S. PATENT DOCUMENTS

2017/0161635 A1* 6/2017 Oono .................... G06N 7/005
2018/0321421 A1* 11/2018 Halabe .................. E21B 41/00

OTHER PUBLICATIONS

Stephen Mahar, P. Daniel Wright, The value of postponing online fulfillment decisions in multi-channel retail/e-tail organizations, Computers & Operations Research, vol. 36, Issue 11, 2009, pp. 3061-3072, ISSN 0305-0548, https://doi.org/10.1016/j.cor.2009.02.007. (Year: 2009).*

S.A. Torabi, E. Hassini, M. Jeihoonian, Fulfillment source allocation, inventory transshipment, and customer order transfer in e-tailing, Transportation Research Part E: Logistics and Transportation Review, vol. 79, 2015, pp. 128-144, ISSN 1366-5545 , https://doi.org/10.1016/j.tre.2015.04.004. (Year: 2015).*

DM Roijers, P Vamplew, S Whiteson, R Dazeley. A Survey of Multi-Objective Sequential Decision-Making—Journal of Artificial Intelligence Research, vol. 48 (2013), DOI https://doi.org/10.1613/jair.3987 (Year: 2013).*

Pasandideh, S. H., Reza, Niaki, S. T., Akhavan, & Hajipour, V. (2013). A multi-objective facility location model with batch arrivals: Two parameter-tuned meta-heuristic algorithms. Journal of Intelligent Manufacturing, 24(2), 331-348. doi:http://dx.doi.org/10.1007/s10845-011-0592-7 (Year: 2013).*

Yu, V. F., Nur Mayke, E. N., & Huynh, T. L. (2015). Integrated location-production-distribution planning in a multiproducts supply chain network design model. Mathematical Problems in Engineering, 2015, n/a. doi:http://dx.doi.org/10.1155/2015/473172 (Year: 2015).*

Tan, K. C., Lee, T. H., & Khor, E. F. (2002). Evolutionary algorithms for multi-objective optimization: Performance assessments and comparisons. The Artificial Intelligence Review, 17(4), 251-290. doi:http://dx.doi.org/10.1023/a:1015516501242 (Year: 2002).*

Bertsimas, D., Natarajan, K., & Chung-Piaw Teo. (2006). Persistence in discrete optimization under data uncertainty. Mathematical Programming, 108(2-3), 251. doi:http://dx.doi.org/10.1007/s10107-006-0710-z (Year: 2006).*

Wu, X. (2009). A weighted generalized maximum entropy estimator with a data-driven weight. Entropy, 11(4), 917-930. doi:http://dx.doi.org/10.3390/e11040917 (Year: 2009).*

Zheng, F., Simpson, A. R., & Zecchin, A. C. (2011). A combined NLP-differential evolution algorithm approach for the optimization of looped water distribution systems. Water Resources Research, 47(8), n/a. doi:http://dx.doi.org/10.1029/2011WR010394 (Year: 2011).*

Agatz N, Fleischmann M, van Nunen J., 2008, "E-fulfillment and multi-channel distribution—A review," European Journal of Operational Research, 187(2), 339-356. doi:10.1016/j.ejor.2007.04.024 (Year: 2008).*

Keller, L.R., et al., "Multiple-Objective Decision Analysis Involving Multiple Stakeholders", Tutorials in Operations Research, Informs 2009, Oct. 11-14, 2014, pp. 139-155.

Acimovic, J. A., "Lowering Outbound Shipping Costs in an Online Retail Environment by Making Better Fulfillment and Replenishment Decisions", MIT PhD thesis, Aug. 2012, pp. 1-198.

Kewill Corporation, "Omni-channel Optimization for Retailers: Fulfillment best practice to deliver on customer promises and drive down returns", Jul. 2013, 12 pages.

Xu, P. J., "Order Fulfillment in Online Retailing: What Goes Where", MIT thesis, Aug. 2005, pp. 1-146.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

AUTOMATIC LEARNING OF WEIGHT SETTINGS FOR MULTI-OBJECTIVE MODELS

CROSS-REFERENCE TO RELATED APPLICATIONS

This application claims the benefit of U.S. Provisional Application No. 62/279,738, filed on Jan. 16, 2016, which is incorporated by reference herein in its entirety.

FIELD

The present application relates generally to computers and computer applications, and more particularly to computer learning and automatic learning of weight settings for multi-objective models.

BACKGROUND

The objective function of optimization models usually includes multiple components to achieve an optimal balance among multiple conflicting objectives such as to decrease cost versus to increase service level. Users often need to adjust the weights of objective components to meet different goals. The selection of weight settings helps in achieving the optimal and practical solution for a given set of business goals, but is a challenging task for a user, e.g., with little operation research background, given the highly abstract mathematical expressions.

The standard practice in the industry and academia is to set weights to an optimization function or model based on user experiences, intuition or through testing of different weight settings to determine the preferred weights. The selection of weight settings helps in achieving the optimal and practical solution for a given set of business goals, but is a challenging task for a user. The mathematical formulas built by operation research specialists may not be intelligible enough for users to set weights accurately purely based on their experiences or intuition, which may lead to sub-optimal impractical solutions. Further, testing of different weight settings can get time-consuming especially for a large scale problem.

The present disclosure describes a self-learning approach to automatically generate weight settings, for example, optimal weight settings, for a given set of goals.

BRIEF SUMMARY

A computer-implemented method and system of automatic learning of weight settings of a multi-objective optimization may be provided. The method, in one aspect, may include receiving, by one or more processors, a historical scenario and historical decisions made in the historical scenario, the historical decisions representing a set of decision variables of an objective function, the objective function comprising multiple objectives, each of the multiple objectives comprising one or more decision variables from the set of decision variables. The method may also include generating, by one or more of the processors, a random set of decision variables having different values than the set of decision variables. The method may further include building, by one or more of the processors, a number of inequalities and solving the inequalities to determine a weight setting associated with each of the multiple objectives, the inequalities built with an assumption that, for an optimization that minimizes the objective function, the objective function having the set of random decision variables has a larger value than the objective function having the set of decision variables. The method may also include repeating the receiving, the generating and the building steps, wherein multiple sets of weight settings are determined for the multiple objectives. The method may further include searching the multiple sets of weight settings to select a target weight setting for each of the multiple objectives. The method may also include continuously and automatically updating the target weight setting associated with each of the multiple objectives based on continuously receiving additional decisions made to additional scenarios and automatically executing the generating, the building and the searching.

A system of automatic learning weight settings of a multi-objective optimization, in one aspect, may include one or more storage devices and one or more hardware processors coupled to one or more of the storage devices. One or more of the hardware processors may be operable to receive a historical scenario and historical decisions made in the historical scenario from one or more of the storage devices, the historical decisions representing a set of decision variables of an objective function, the objective function comprising multiple objectives, each of the multiple objectives comprising one or more decision variables from the set of decision variables. One or more of the hardware processors may be further operable to generate a random set of decision variables having different values than the set of decision variables. One or more of the hardware processors may be further operable to build a number of inequalities and solving the inequalities to determine a weight setting associated with each of the multiple objectives, the inequalities built with an assumption that, for an optimization that minimizes the objective function, the objective function having the set of random decision variables has a larger value than the objective function having the set of decision variables. One or more of the hardware processors may be further operable to repeat the receiving, the generating and the building steps, wherein multiple sets of weight settings are determined for the multiple objectives. One or more of the hardware processors may be further operable to search the multiple sets of weight settings to select a target weight setting for each of the multiple objectives. One or more of the hardware processors may be further operable to continuously and automatically update the target weight setting associated with each of the multiple objectives based on continuously receiving additional decisions made to additional scenarios and automatically executing the generating, the building and the maximizing steps.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and technique may be provided that set the weights of multiple objectives of a model, for example, with less time compared to testing of different weight settings. Humans excel in making the best decisions for small scale problems compared to a computer system, for example, in retailing industry that includes many artistic factors difficult for a system to capture.

The system and method in one embodiment incorporates valuable experiences and insights derived from historical decisions made by business users to determine an optimal weight setting for a given set of goals. In one embodiment, the system and method may set the weights of multiple objectives in a more accurate way compared to purely experience-based approaches and with less time compared to testing of different weight settings.

Figure 1:
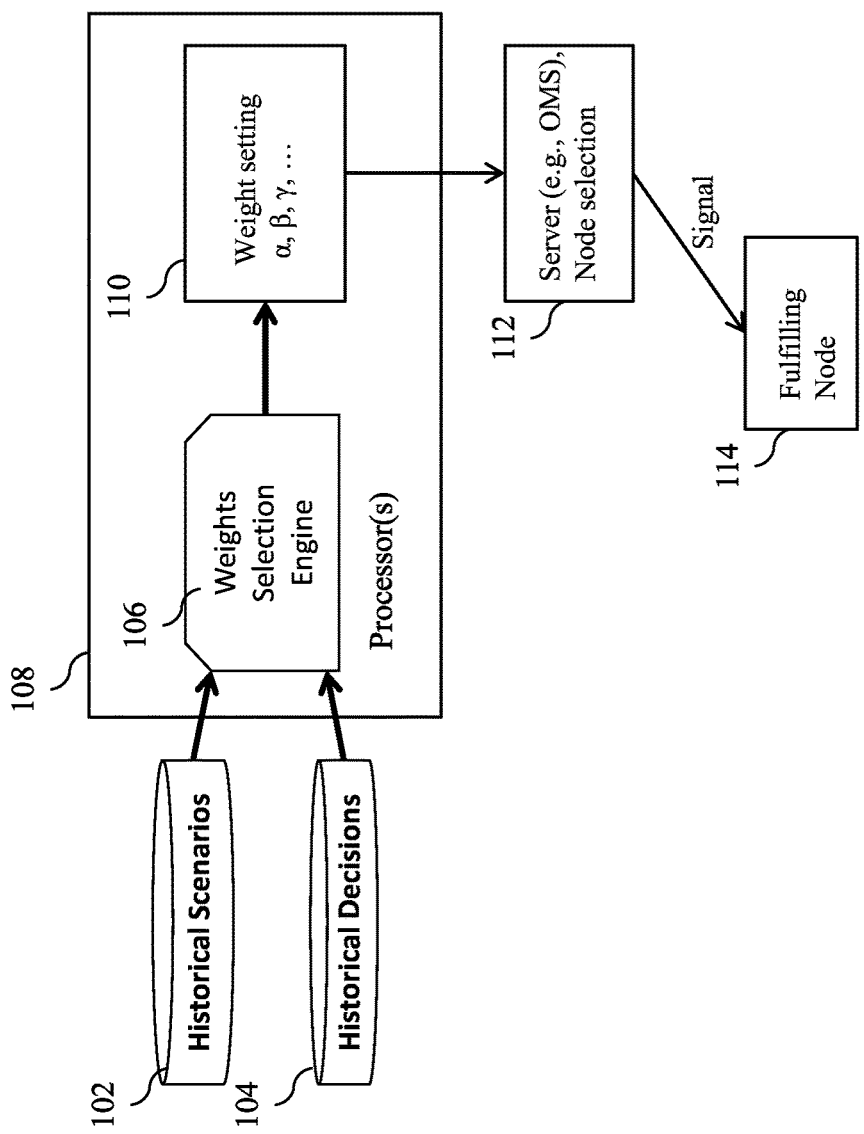
FIG. 1 is a diagram illustrating components of a system of the present disclosure in one embodiment that automatically generates optimal weight settings for multi-objective optimization.

FIG. 1 is a diagram illustrating components of a system of the present disclosure in one embodiment that automatically generates optimal weight settings for multi-objective optimization. Automatically generating optimal weight settings for multi-objective optimization in one embodiment continuously self-updates the weight settings by incorporating newly available data, such as newly made decisions. The weighting of the components are adjusted to reflect the importance of the objectives in the objective function.

In one embodiment, for a given set of business goals, a set of different business scenarios and the corresponding decisions are derived from the historical decisions made by business users for a small scale problem. Examples of different scenarios may include selecting the best node from 20 stores to fulfill an e-commerce order from Location A, selecting the best node from 15 stores to fulfill e-commerce order from Location B. A node refers to any fulfillment channel in a fulfillment network, such as a store, a warehouse (distribution center), third party logistics, or any other entity that may include a product for distribution or sale. For each scenario i, the decision made by users is expressed as a set of decision variable: $X_i = (x_i^1, x_i^2 \ldots)$. $X_i$ is a vector that represents the decision made by users in scenario i. $X_i$ includes a set of decisions variables, $x_i^1, x_i^2 \ldots$. The number of decision variables can be different in different business problems.

Table 1 illustrates a set of historical scenarios and historical decisions.

TABLE 1

| Historical Scenarios | Historical Decisions |
|---|---|
| Scenario 1 | $X_1$ |
| Scenario 2 | $X_2$ |
| ... | ... |
| Scenario n | $X_n$ |

Objective function is formulated as:
Objective=$\alpha$*obj1+$\beta$*obj2+$\gamma$*obj3+ . . .

In an online order fulfillment example, obj1 can be the shipping cost, obj2 can be the markdown cost, and obj3 can be the operational cost. Other costs may be formulated as additional objects. Example of decision variables may include: which warehouses are used to fulfill the order; which carriers are used; which shipping options are used, e.g., ground shipping or next day air. The objective function is the same for all scenarios and each scenario can be represented by fulfilling an order.

In one embodiment, historical scenarios 102 and the corresponding decisions 104 are passed into a weight selection engine 106. For example, a threshold number of historical scenarios 102 and corresponding decisions 104 that are available may be sent to the weight selection engine 106. In one embodiment, all historical scenarios 102 and corresponding decisions 104 are passed into a weight selection engine 106.

The objective function, for instance, may have been pre-constructed by a user or the like. For an order, when decisions are made, the objectives will be computed, e.g., the shipping cost will be computed after the deciding on which warehouse, carrier and shipping method are used. The objective function is a weighted average of different objectives. The formulation of each objective is given but the weight is not. The weight selection engine 106 automatically determines the weights for the components of the object function.

The weight selection engine 106 in one embodiment runs or executes on one or more hardware processors 108, and outputs weight settings considered to be optimal 110. For example, a solver within the weight selection engine 106 builds a number of inequalities and solves the inequalities to obtain a weight setting for each scenario i, ($\alpha_i$, $\beta_i$, $\gamma_i$, . . . ).

Consider the following objective function in a more detailed form:

$$\text{Objective}(X,\alpha,\beta,\gamma,\ldots) = \alpha*\text{obj1}(X) + \beta*\text{obj2}(X) + \gamma*\text{obj3}(X) + \ldots$$

The overall objective function is a function of decision as well as the weight parameters. For the multiple objectives on the right hand side, each of them is a function of the decision.

For example, for a scenario i, the user has a decision $X_i = (x_i^1, x_i^2 \ldots)$, which will result in a value of the objective function Objective($X_i$, $\alpha$, $\beta$, $\gamma$, . . . )

In one embodiment, the weight selection engine 106 may automatically generate a decision $X_i'$, which will result in a value of the objective function Objective($X_i'$, $\alpha$, $\beta$, $\gamma$, . . . ). The decision $X_i'$ may be randomly generated, and is different from the user's decision. The weight selection engine 106 in one embodiment assumes that the value of the objective function will be the smallest (largest) when adopting the user's decision $X_i$, when the business goal is to minimize (maximize) the objective function. The weight selection engine 106 constructs and applies the following inequality:

$$\text{Objective}(X_i',\alpha,\beta,\gamma,\ldots) >= \text{Objective}(X_i,\alpha,\beta,\gamma,\ldots).$$

The weight selection engine 106 finds a set of weight parameters (a*, $\beta$*, $\gamma$*, . . . ) so that $$\text{Objective}(X_i',\alpha*,\beta*,\gamma*,\ldots) >= \text{Objective}(X_i,\alpha*,\beta*,\gamma*,\ldots) \text{ for any } X_i'.$$

In order to find $\alpha$*, $\beta$*, $\gamma$*, . . . , the weight selection engine 106 constructs more than one of such inequalities. For example, if there are n weight parameters, the weight selection engine 106 constructs and uses at least n such inequalities. In one embodiment, the weight selection engine 106 automatically generates at least n random decisions $X_i'$ and construct at least n inequalities Objective($X_i'$, $\alpha$*, $\beta$*, $\gamma$*)>=Objective($X_i$, $\alpha$*, $\beta$*, $\gamma$*). Then the weight selection engine 106 in one embodiment solves this n inequalities to find the optimal set of weight parameters ($\alpha$*, $\beta$*, $\gamma$*, . . . ).

The following describes the above logic of inequalities formulation in one embodiment. For a given scenario, the decision made by users is considered optimal. Thus, for any decision $X_i' \neq X_i$ the corresponding objective ($\alpha$*obj1'+ $\beta$*obj2'+$\gamma$*obj3'+ . . . ) is larger than Objective i (or larger than or equal to), if the objective is to minimize the objective function. 'Any decision' is an automatically generated decision that is different from the actual user's decision. Each inequality compares the objective ($\alpha$*obj1'+$\beta$*obj2'+ $\gamma$*obj3'+ . . . ) computed by adopting this 'any decision' against the objective computed by adopting the user's decision. Since it is assumed that the user's decision is always the optimal one, the value of the objective computed from adopting the user's decision is always less than that from adopting this 'any decision' if the weight selection engine 106 is to minimize this objective function. In one embodiment, for each scenario, the weight selection engine 106 uses only one user's decision but many more 'any decisions'.

In one embodiment, if the weight selection engine 106 is working with an objective function to be maximized (optimization that maximizes an objective function), then the value of the objective computed from adopting the user's decision would be always greater than the value of the objective computed from adopting automatically generated 'any decision'.

In one embodiment, the weight selection engine 106 selects a confidence level. The confidence level represents an interval that surrounds the optimal values of ($\alpha$, $\beta$, $\gamma$, . . . ) in the form of percentages, a range of values around the weight values, which in one embodiment may be accepted as optimal. For example, if ($\alpha$, $\beta$, $\gamma$, . . . )= (1, 2, 3, . . . ) and if a confidence interval of 10% is selected, then the interval [Wi] may be expressed as ([0.9, 1.1], [1.8, 2.2], [2.7, 3.3] . . . ), e.g., a range of values between − and + the % of the weight values. In one embodiment, any ($\alpha$, $\beta$, $\gamma$, . . . ) that falls in this interval may be considered optimal for scenario i. For each scenario, an optimal weight setting can be expressed as interval [$W_i$] around ($\alpha_i$, $\beta_i$, $\gamma_i$). An example of a confidence interval may be 5% or 10%, e.g., based on a user's need and may be configurable. The weight selection engine 106 searches the ($\alpha$*, $\beta$*, $\gamma$*, . . . ) to maximize $$\sum_i f_i(\alpha, \beta, \gamma, \dots),$$

where $f_i(\alpha, \beta, \gamma, \dots)=1$, when ($\alpha$, $\beta$, $\gamma$, . . . ) belongs to the interval [$W_i$]. Based on the defined interval, a set of ($\alpha$, $\beta$, $\gamma$, . . . ) that falls in most of the intervals of all the scenarios is searched for. The function $f$ is defined such that when maximizing the sum of this $f$ function, it is ensured that ($\alpha$*, $\beta$*, $\gamma$*, . . . ) falls in most of the intervals of all the scenarios. This step finds a set of weightings ($\alpha$*, $\beta$*, $\gamma$*, . . . ) which are in the confidence intervals of the optimal weight settings of the scenarios. Note that when ($\alpha$*, $\beta$*, $\gamma$*, . . . ) is in the interval [$W_i$] of ($\alpha_i$, $\beta_i$, $\gamma_i$, . . . ), $f_i(\alpha, \beta, \gamma, \dots)=1$. Otherwise, $f_i(\alpha, \beta, \gamma, \dots)=0$. In one embodiment, the $f$ function is defined to ensure that when maximizing the sum of this function, the weight selection engine 106 finds a $\alpha$*, $\beta$*, $\gamma$*, . . . that results in the largest value of $$\sum_i f_i(\alpha, \beta, \gamma, \dots).$$

In one embodiment, this $f$ function is used to search for the ($\alpha$, $\beta$, $\gamma$, . . . ) such that those values in the interval [$W_i$] for most scenarios. For example, consider that there are 10 [$W_i$]'s, then the system of the present disclosure in one embodiment may search for ($\alpha$, $\beta$, $\gamma$, . . . ) such that they are in most of the 10 [$W_i$]'s. For instance, when maximizing the sum of $$\sum_i f_i(\alpha, \beta, \gamma, \dots),$$

the system in one embodiment may find that ($\alpha$*, $\beta$*, $\gamma$*, . . . ) results in 9, which indicates that the system finds a set of weight settings that are in 9 of 10 [Wi]'s, and 9 is the maximum the system can get. The system in one embodiment may consider ($\alpha$*, $\beta$*, $\gamma$*, . . . ) to be the optimal weight setting for the objectives in the optimization.

In one embodiment, the weight selection engine 106 first generates the optimal weights for each scenario, e.g., independently of other scenarios. The actual processing may be performed in parallel or at one at a time, by one or more processors 108. Then the weight selection engine 106 maximizes $$\sum_i f_i(\alpha, \beta, \gamma, \dots)$$

to find the optimal weight setting that ensures that this optimal weight setting is within the intervals of the optimal weight settings for the scenarios.

The weight setting method and system may be utilized in a fulfillment optimizer, for example, which determines one or more nodes from which to fulfill an order, considering business objectives. The weight setting method and system of the present disclosure allows a user to customize the goals according to their needs.

In one embodiment, the weight selection engine 106 automatically generates optimal weight settings for multi-objective optimization, for example, an objective function including multiple objectives. An example may be an online order fulfillment. The objectives may include, but are not limited to minimizing shipping cost, minimizing markdown cost, balancing inventory levels. In practice, the user who is responsible for order fulfillment will want to achieve these objectives at the same time. In most cases, these objectives have different weights and the user will need to make tradeoffs among these weights.

In one embodiment, based on the weight settings, one or more processors or a server like an order management system server 112 may automatically select a particular node for order fulfillment. A control signal may be generated by one or more of the processors or a server and transmitted to the selected node 114 to control the order fulfillment. In one embodiment, for example, an automated storage warehouse or the like may receive such control signal and control equipments for shipping or order fulfillment based on receiving the control signal.

In one embodiment, the weight selection engine 106 continuously self-updates the weights by incorporating a newly available decision. For example, initially, there may be 100 scenarios and the weight selection engine 106 may find the optimal weight setting based on the 100 scenarios. In each scenario, the user makes a decision and the weight selection engine 106 finds the optimal weights for this scenario, and the overall weight settings are selected based on each of the optimal weights in these 100 scenarios. As the user continues to make decisions, more scenarios will be incorporated in this process. The optimal weights settings may be based on more scenarios (more than 100).

In one embodiment, the automatic learning is done by incorporating the newly made decisions by the users. As a new decision is fed into the system or the weight selection engine 106, the weight selection engine 106 first finds the optimal weight setting for this new scenario, and the weight selection engine incorporates this new weight setting in this scenario along with the previous weight settings in earlier scenarios to find the overall weight settings by maximizing $$\sum_i f_i(\alpha, \beta, \gamma, \dots).$$

Figure 2:
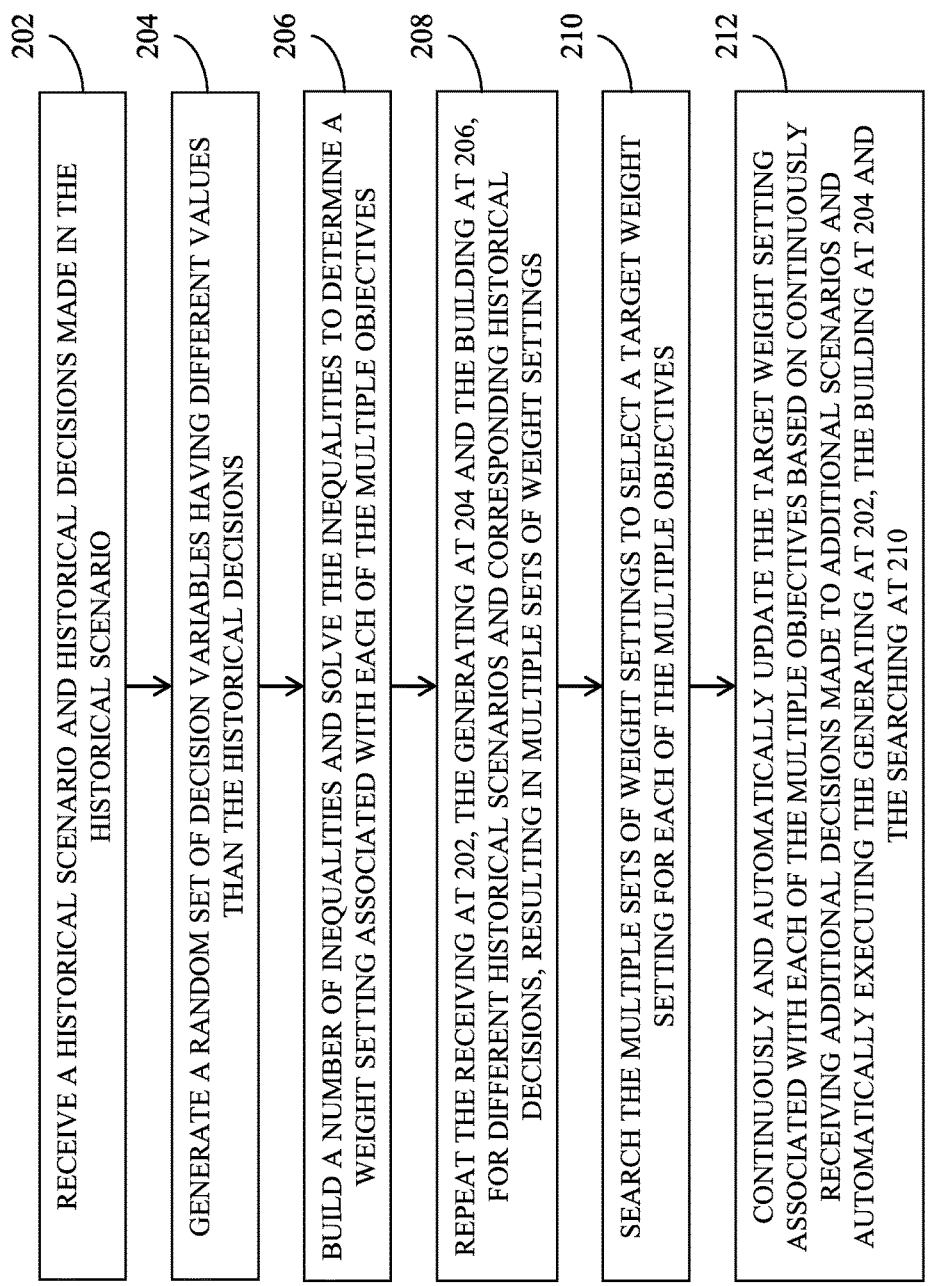
FIG. 2 is a flow diagram illustrating a method of the present disclosure in one embodiment.

FIG. 2 is a flow diagram illustrating a method of the present disclosure in one embodiment. The method includes automatic learning of weight settings of a multi-objective optimization, for instance, in automatic order fulfillment optimization. The method in one embodiment is performed by one or more processors implementing or coupled to an order fulfillment server or the like. At 202, one or more processors may receive a historical scenario and historical decisions made in the historical scenario, for example, from a database management system or like repository. The historical decisions represent a set of decision variables of an objective function, and the objective function includes multiple objectives, for example, as described above. In one embodiment, each of the multiple objectives may include (or is a function of) one or more decision variables (e.g., a historical decision).

At 204, one or more of the processors may generate a random set of decision variables having different values than the set of decision variables. For example, these automatically generated random set of decision variables are decisions different from the historical decisions, for example made by one or more users.

At 206, one or more of the processors may build a number of inequalities and solve the inequalities to determine a weight setting associated with each of the multiple objectives. The inequalities are built with an assumption that, for an optimization that minimizes the objective function, the objective function having the set of random decision variables has a larger value than the objective function having the set of decision variables. In another aspect, the assumption may be that for an optimization that minimizes the objective function, the objective function having the set of random decision variables has a larger than or equal value from the objective function having the set of decision variables.

At 208, one or more of the processors repeats the receiving at 202, the generating at 204 and the building at 206, for different historical scenarios and corresponding historical decisions. The iteration at 208 may be performed for a threshold number of different historical scenarios available. The repeating at 208 results in multiple weight settings being generated. For example, multiple sets of weight settings may be generated, with each set having a weight setting for each of the multiple objectives.

At 210, one or more of the processors may search the multiple sets of weight settings to select a target weight setting for each of the multiple objectives. The searching may include selecting a confidence interval and searching the multiple sets of weight setting around the confidence interval. The searching may also include maximizing a sum over the objective function values of each set of the multiple sets of weight settings to select the target weight setting for each of the multiple objectives.

At 212, one or more of the processors may continuously and automatically update the target weight setting associated with each of the multiple objectives based on continuously receiving additional decisions made to additional scenarios and automatically executing the generating, the building and the searching steps. In this way, one or more of the processors autonomously learns (e.g., self-learns) the optimal weight settings for an optimization model.

A methodology in one embodiment of the present disclosure may convert an abstract model into a concrete model by setting the weights of different objectives in an abstract objective function embedded in an optimization system. The methodology in one embodiment may start with a user's own decision in a set of small scale testing scenarios. A weight selection engine in one embodiment may select an optimal set of weights so that the optimization system has the highest probability to output solutions that are the same as the user's own decisions in those testing scenarios. The methodology of the present disclosure in one embodiment provides automation and therefore, helps users of a large scale optimization system, to assign weights to a set of real world objectives which may be represented in the form of mathematical expressions. With different weights put on different objectives, the optimization system will output different solutions. For the user of such system, setting correct weights to meet the user's objective allows the optimization system to output information that may provide most value to the user.

Figure 3:
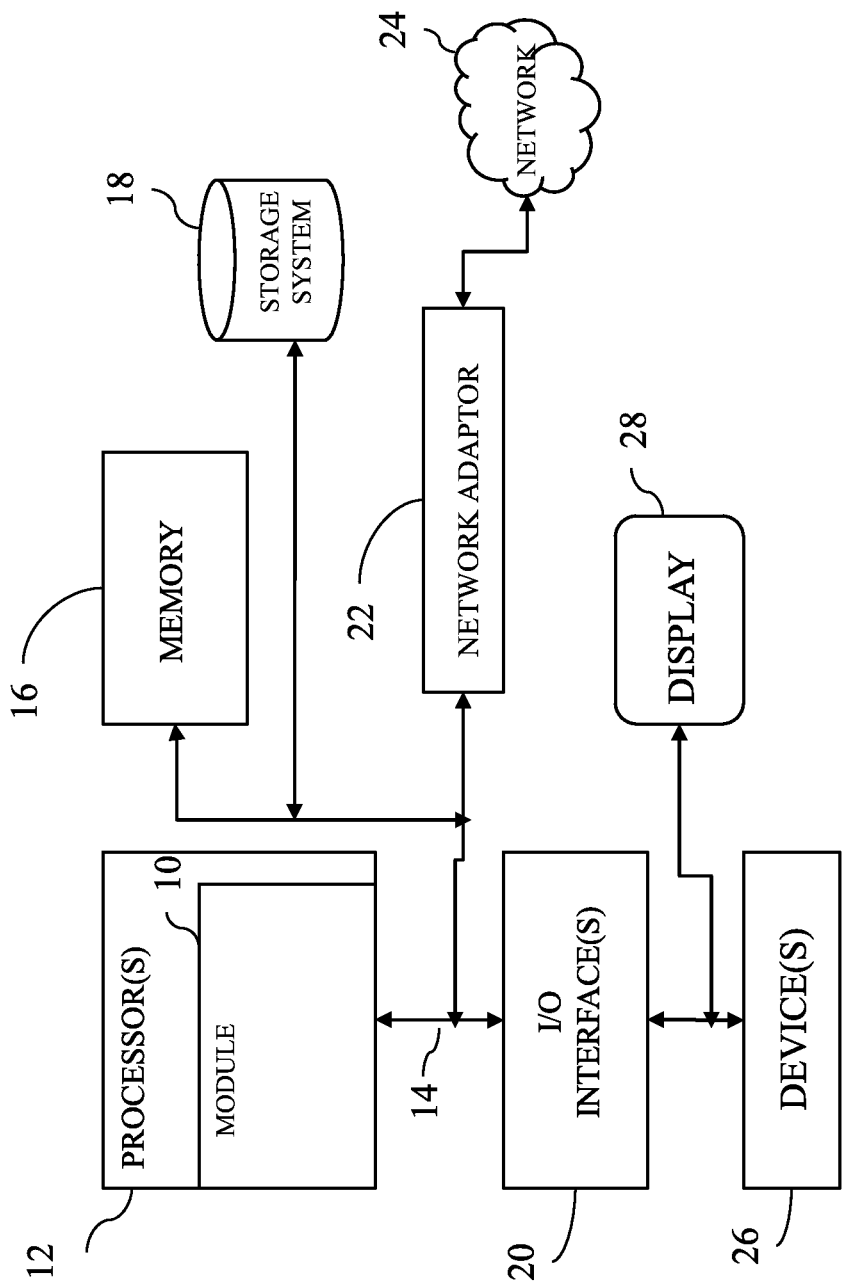
FIG. 3 illustrates a schematic of an example computer or processing system that may implement an automatic learning system in one embodiment of the present disclosure.

FIG. 3 illustrates a schematic of an example computer or processing system that may implement an automatic weight setting learning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of automatic learning of weight settings of a multi-objective optimization, comprising:

receiving, by one or more processors, a historical scenario and historical decisions made in the historical scenario, the historical decisions representing a set of decision variables of an objective function, the objective function comprising multiple objectives, each of the multiple objectives comprising one or more decision variables from the set of decision variables;

generating, by one or more of the processors, a random set of decision variables having different values than the set of decision variables;

building, by one or more of the processors, a number of inequalities and solving the inequalities to determine a weight setting associated with each of the multiple objectives, the inequalities built with an assumption that, for an optimization that minimizes the objective function, the objective function having the set of random decision variables has a larger value than the objective function having the set of decision variables;

repeating the receiving, the generating and the building steps, wherein multiple sets of weight settings are determined for the multiple objectives;

searching the multiple sets of weight settings to select a target weight setting for each of the multiple objectives;

self-learning automatically by one or more of the processors by continuously and automatically updating the target weight setting associated with each of the multiple objectives based on continuously receiving additional decisions made to additional scenarios and automatically executing the generating, the building and the searching;

based on the target weight setting, automatically selecting a node for order fulfillment; and controlling order fulfillment at the selected node by controlling an automated storage warehouse system associated with the selected node.

2. The method of claim 1, wherein the objective function optimizes an online fulfillment order.

3. The method of claim 1, wherein the historical decisions comprise user decisions.

4. The method of claim 1, wherein the searching comprises selecting a confidence interval and searching the multiple sets of weight settings around the confidence interval.

5. The method of claim 1, wherein the searching comprises maximizing a sum over the objective function values of each the multiple weight settings to select the target weight setting for each of the multiple objectives.

6. The method of claim 1, wherein the objective function is pre-constructed.

7. The method of claim 1, wherein the multiple objectives comprises shipping cost markdown cost, and operational cost.

8. A system of automatic learning weight settings of a multi-objective optimization, comprising:
one or more storage devices;
one or more hardware processors coupled to one or more of the storage devices,
one or more of the hardware processors operable to receive a historical scenario and historical decisions made in the historical scenario from one or more of the storage devices, the historical decisions representing a set of decision variables of an objective function, the objective function comprising multiple objectives, each of the multiple objectives comprising one or more decision variables from the set of decision variables,
one or more of the hardware processors further operable to generate a random set of decision variables having different values than the set of decision variables,
one or more of the hardware processors further operable to build a number of inequalities and solving the inequalities to determine a weight setting associated with each of the multiple objectives, the inequalities built with an assumption that, for an optimization that minimizes the objective function, the objective function having the set of random decision variables has a larger value than the objective function having the set of decision variables,
one or more of the hardware processors further operable to repeat the receiving, the generating and the building steps, wherein multiple sets of weight settings are determined for the multiple objectives,
one or more of the hardware processors further operable to search the multiple sets of weight settings to select a target weight setting for each of the multiple objectives,
one or more of the hardware processors further operable to self-learning automatically by continuously and automatically update the target weight setting associated with each of the multiple objectives based on continuously receiving additional decisions made to additional scenarios and automatically executing the generating, the building and the searching steps,
based on the target weight setting, one or more of the hardware processors automatically selecting a node for order fulfillment; and
one or more of the hardware processors further operable to control order fulfillment at the selected node by controlling an automated storage warehouse system associated with the selected node.

9. The system of claim 8, wherein the objective function optimizes an online fulfillment order.

10. The system of claim 8, wherein the historical decisions comprise user decisions.

11. The system of claim 8, wherein one or more of the processors searches by selecting a confidence interval and searching the multiple sets of weight settings around the confidence interval.

12. The system of claim 8, wherein one or more of the processors searches by maximizing a sum over the objective function values of each the multiple weight settings to select the target weight setting for each of the multiple objectives.

13. The system of claim 8, wherein the objective function is pre-constructed.

14. The system of claim 8, wherein the multiple objectives comprises shipping cost markdown cost, and operational cost.

15. A computer program product comprising a computer readable storage medium having program instructions embodied therewith, wherein the computer readable storage medium is not a transitory signal per se, the program instructions readable by a device to cause the device to perform a method comprising:
receiving a historical scenario and historical decisions made in the historical scenario, the historical decisions representing a set of decision variables of an objective function, the objective function comprising multiple objectives, each of the multiple objectives comprising one or more decision variables from the set of decision variables;
generating a random set of decision variables having different values than the set of decision variables;
building a number of inequalities and solving the inequalities to determine a weight setting associated with each of the multiple objectives, the inequalities built with an assumption that, for an optimization that minimizes the objective function, the objective function having the set of random decision variables has a larger value than the objective function having the set of decision variables;
repeating the receiving, the generating and the building steps, wherein multiple sets of weight settings are determined for the multiple objectives;
searching the multiple sets of weight settings to select a target weight setting for each of the multiple objectives; and
self-learning automatically by continuously and automatically updating the target weight setting associated with each of the multiple objectives based on continuously receiving additional decisions made to the additional scenario and automatically executing the generating, the building and the searching steps;
based on the target weight setting, automatically selecting a node for order fulfillment; and
controlling order fulfillment at the selected node by controlling an automated storage warehouse system associated with the selected node.

16. The computer program product of claim 15, wherein the objective function optimizes an online fulfillment order.

17. The computer program product of claim 15, wherein the historical decisions comprise user decisions.

18. The computer program product of claim 15, wherein the searching comprises selecting a confidence interval and searching the multiple sets of weight settings around the confidence interval.

19. The computer program product of claim 15, wherein the searching comprises maximizing a sum over the objective function values of each the multiple weight settings to select the target weight setting for each of the multiple objectives.

20. The computer program product of claim 15, wherein the objective function is pre-constructed and the multiple objectives comprises shipping cost markdown cost, and operational cost.

* * * * *